United States Patent
Song et al.

(10) Patent No.: US 12,202,513 B2
(45) Date of Patent: Jan. 21, 2025

(54) METHOD OF DETERMINING VEHICLE TRAVEL TRAJECTORY, ELECTRONIC DEVICE, STORAGE MEDIUM, AND VEHICLE

(71) Applicant: BAIDU USA LLC, Sunnyvale, CA (US)

(72) Inventors: Ruitao Song, Sunnyvale, CA (US); Liangjun Zhang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 357 days.

(21) Appl. No.: 17/709,601

(22) Filed: Mar. 31, 2022

(65) Prior Publication Data

US 2022/0219730 A1    Jul. 14, 2022

(51) Int. Cl.
*B60W 60/00* (2020.01)
*B60W 30/14* (2006.01)
*B60W 40/068* (2012.01)
*B60W 40/105* (2012.01)

(52) U.S. Cl.
CPC ...... *B60W 60/0011* (2020.02); *B60W 30/143* (2013.01); *B60W 40/068* (2013.01); *B60W 40/105* (2013.01); *B60W 60/0023* (2020.02); *B60W 2300/17* (2013.01); *B60W 2552/05* (2020.02); *B60W 2552/35* (2020.02); *B60W 2552/40* (2020.02)

(58) Field of Classification Search
CPC ........... B60W 60/0011; B60W 30/143; B60W 40/068; B60W 40/105; B60W 60/0023; B60W 2300/17; B60W 2552/05; B60W 2552/35; B60W 2552/40; B60W 2720/103

USPC ........................................................ 701/23
See application file for complete search history.

(56) References Cited

U.S. PATENT DOCUMENTS

| | | | |
|---|---|---|---|
| 2004/0158355 A1* | 8/2004 | Holmqvist | G05D 1/0236 701/23 |
| 2021/0370509 A1* | 12/2021 | Pivac | G05B 19/4155 |
| 2023/0266773 A1* | 8/2023 | Ding | G05D 1/0088 701/1 |

FOREIGN PATENT DOCUMENTS

CN    112859845 A    *    5/2021

OTHER PUBLICATIONS

English Translation CN112859845 (Year: 2021).*

* cited by examiner

*Primary Examiner* — Scott A Reinbold
(74) *Attorney, Agent, or Firm* — Pillsbury Winthrop Shaw Pittman, LLP

(57) ABSTRACT

A method of determining a vehicle travel trajectory, an electronic device, a storage medium and a vehicle, which relate to a field of an artificial intelligence technology, in particular to a field of autonomous driving and intelligent transportation. A specific implementation solution includes: determining an initial path information for a vehicle; optimizing the initial path information to generate a target optimized path information; determining an optimized mapping relationship for velocity according to the target optimized path information and a first energy consumption constraint parameter; and determining an optimized trajectory for the vehicle according to the target optimized path information and the optimized mapping relationship for velocity.

20 Claims, 6 Drawing Sheets

METHOD OF DETERMINING VEHICLE TRAVEL TRAJECTORY, ELECTRONIC DEVICE, STORAGE MEDIUM, AND VEHICLE

TECHNICAL FIELD

The present disclosure generally relates to a field of an artificial intelligence technology, in particular to a field of autonomous driving and intelligent transportation, and specifically to a method of determining a vehicle travel trajectory, an electronic device, a storage medium, and a vehicle.

BACKGROUND

In the field of autonomous driving, a method is implemented to determine a shortest path as a vehicle travel trajectory. However, the above-mentioned method of determining the vehicle travel trajectory does not consider factors such as a path turning radius, a ground condition, a vehicle travelling speed, etc., which may result in a high energy consumption and even a potential safety hazard during a vehicle driving.

SUMMARY

The present disclosure provides a method of determining a vehicle travel trajectory, an electronic device, a storage medium, and a vehicle.

According to an aspect of the present disclosure, there is provided a method of determining a vehicle travel trajectory, including: determining an initial path information for a vehicle; optimizing the initial path information to generate a target optimized path information; determining an optimized mapping relationship for velocity according to the target optimized path information and a first energy consumption constraint parameter; and determining an optimized trajectory for the vehicle according to the target optimized path information and the optimized mapping relationship for velocity.

According to another aspect of the present disclosure, there is provided an electronic device, including: at least one processor; and a memory communicatively connected to the at least one processor; wherein the memory stores instructions executable by the at least one processor, and the instructions, when executed by the at least one processor, cause the at least one processor to perform an operation of determining a vehicle travel trajectory, including: determining an initial path information for a vehicle; optimizing the initial path information to generate a target optimized path information; determining an optimized mapping relationship for velocity according to the target optimized path information and a first energy consumption constraint parameter; and determining an optimized trajectory for the vehicle according to the target optimized path information and the optimized mapping relationship for velocity.

According to another aspect of the present disclosure, there is provided a vehicle including the electronic device according to embodiments of the present disclosure.

According to another aspect of the present disclosure, there is provided a non-transitory computer-readable storage medium storing computer instructions, wherein the computer instructions allow a computer to perform an operation of determining a vehicle travel trajectory, including: determining an initial path information for a vehicle; optimizing the initial path information to generate a target optimized path information; determining an optimized mapping relationship for velocity according to the target optimized path information and a first energy consumption constraint parameter; and determining an optimized trajectory for the vehicle according to the target optimized path information and the optimized mapping relationship for velocity.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to better understand the solution and do not constitute a limitation to the present disclosure.

DETAILED DESCRIPTION OF EMBODIMENTS

The following describes exemplary embodiments of the present disclosure with reference to the accompanying drawings, which include various details of embodiments of the present disclosure to facilitate understanding, and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

In a field of autonomous driving, a vehicle travel trajectory may be determined with a shortest path as a target. However, the above-mentioned method of determining the vehicle travel trajectory does not consider factors such as a path turning radius, a ground condition, a vehicle speed, etc., which may result in a high energy consumption during vehicle driving. Especially for a power shovel type vehicle, the power shovel has a greater weight compared with an ordinary vehicle (such as a car), and a road condition for the electric shovel is more complex. Therefore, the electric shovel is more sensitive to the energy consumption. If a driving path for the electric shovel is determined only with the shortest path as the target, it is difficult to obtain a satisfactory energy consumption effect, and even may cause a potential safety hazard.

Figure 1:
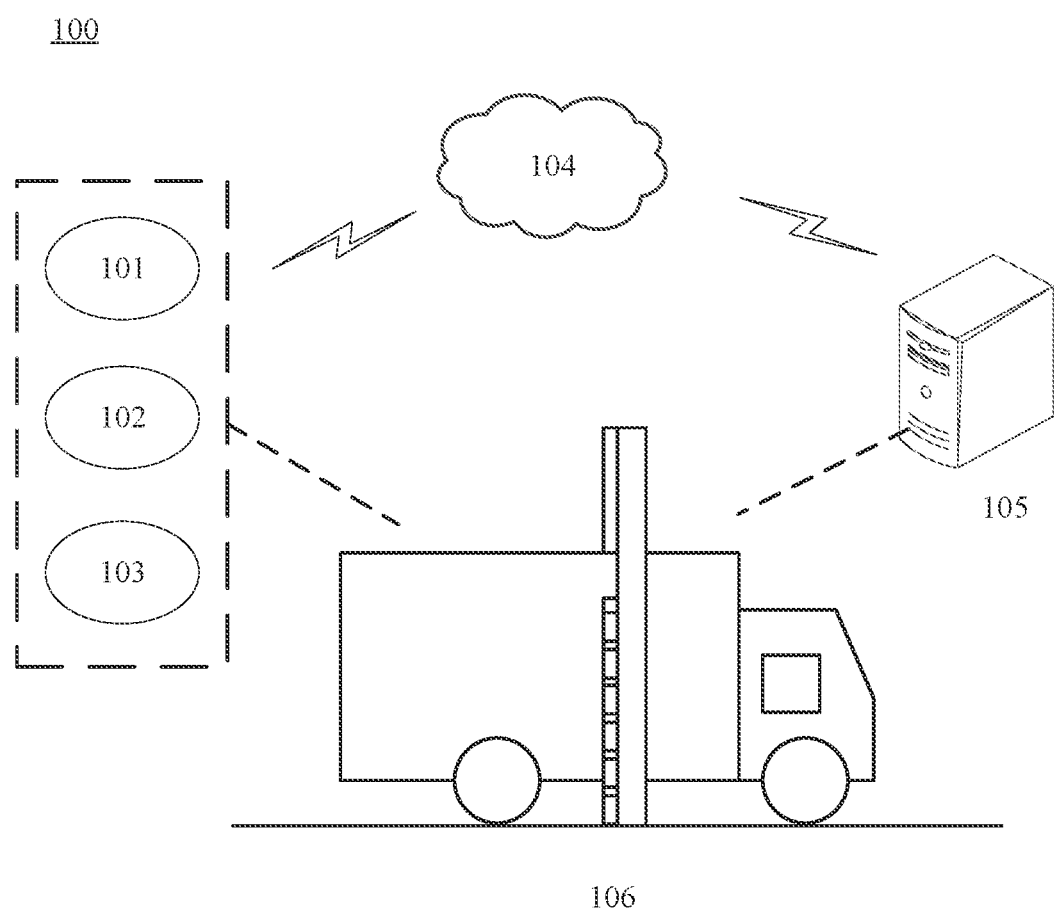
FIG. 1 shows an exemplary system architecture to which a method and an apparatus of determining a vehicle travel trajectory may be applied according to embodiments of the present disclosure.

FIG. 1 shows an exemplary system architecture to which a method and an apparatus of determining a vehicle travel trajectory may be applied according to embodiments of the present disclosure.

It should be noted that FIG. 1 is only an example of a system architecture in which embodiments of the present disclosure may be applied, so as to help those skilled in the art to understand the technical content of the present disclosure. It does not mean that embodiments of the present disclosure may not be applied to other apparatuses, systems, environments or scenes.

As shown in FIG. 1, a system architecture 100 according to the embodiment may include sensors 101, 102, 103, a network 104, and a server 105. The network 104 is used to provide a medium for a communication link between the terminal devices 101, 102, 103 and the server 105. The network 104 may include various connection types, such as wired or wireless communication links, etc.

The sensors 101, 102, 103 may interact with the server 105 through the network 104 so as to receive or transmit a message, etc.

The sensors 101, 102 and 103 may be functional elements integrated on a vehicle 106, such as infrared sensor, ultrasonic sensor, millimeter wave radar, information acquisition device, etc. The sensors 101, 102 and 103 may be used to capture an obstacle information, a path constraint information, a ground type information and a surrounding road information around the vehicle 106.

The server 105 may also be integrated on the vehicle 106, but it is not limited to this. The server 105 may also be provided at a remote end that may establish communication with a vehicle terminal and may be implemented as a distributed server cluster including a plurality of servers or as a single server.

The server 105 may be a server that provides various services. For example, a map application, an information processing application and the like may be installed on the server 105. Taking the server 105 running the information processing application as an example, the obstacle information, the path constraint information and the ground type information transmitted from the sensors 101, 102 and 103 are received through the network 104, an initial path information for the vehicle 106 is determined based on the obstacle information, the path constraint information and the ground type information, the initial path information is optimized to generate a target path information, an optimized mapping relationship for velocity is determined according to the target optimized path information, and an optimized trajectory for the vehicle 106 is determined according to the target optimized path information and the optimized mapping relationship for velocity, so as to determine an autonomous driving strategy of the vehicle 106 based on the optimized trajectory for the vehicle 106.

It should be noted that the method of determining the vehicle travel trajectory provided by embodiments of the present disclosure may generally be performed by the server 105. Accordingly, the apparatus of determining the vehicle travel trajectory provided by embodiments of the present disclosure generally may also be arranged in the server 105. However, embodiments of the present disclosure are not limited to this. The method of determining the vehicle travel trajectory provided by embodiments of the present disclosure may also be performed by the vehicle 106. Accordingly, the apparatus of determining the vehicle travel trajectory provided by embodiments of the present disclosure generally may also be arranged in the vehicle 106.

It should be understood that the number of sensors, network and server in FIG. 1 is only schematic. The system architecture may include any number of sensor, network and server according to implementation needs. It should be noted that the sequence number of each operation in the following method is only used to indicate the operation for description, and should not be regarded as indicating the execution order of the operations. Unless explicitly stated, the method does not need to be performed exactly in the order shown.

Figure 2:
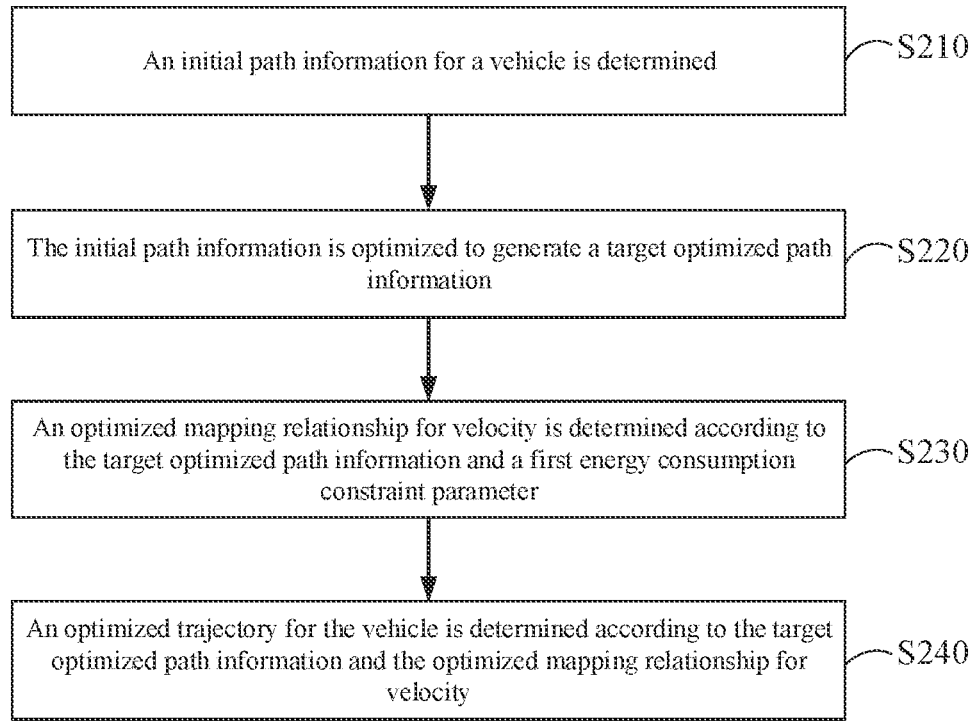
FIG. 2 shows a flowchart of a method of determining a vehicle travel trajectory according to embodiments of the present disclosure.

FIG. 2 shows a flowchart of a method of determining a vehicle travel trajectory according to embodiments of the present disclosure.

As shown in FIG. 2, a method 200 of determining a vehicle travel trajectory may include operations S210 to S240.

In operation S210, an initial path information for a vehicle is determined.

According to embodiments of the present disclosure, the initial path information for the vehicle indicates an initial path without collision and with an optimal energy consumption determined between a starting point and a target point. The initial path information may be understood as a data set containing a plurality of path points, and the plurality of path points may form the above-mentioned initial path. According to embodiments of the present disclosure, each of the plurality of path points contains an abscissa information, an ordinate information and a vehicle orientation information in a global coordinate system. The vehicle orientation information may refer to, for example, a deflection angle of a longitudinal axis of the vehicle with respect to a plane where a driving wheel of the vehicle is located. The longitudinal axis of the vehicle may refer to an axis of symmetry of the vehicle in a travel direction.

According to embodiments of the present disclosure, the vehicle described above may be any type of vehicle. In an example, the vehicle may be an electric shovel, but the present disclosure is not limited thereto. In operation S220, the initial path information is optimized to generate a target optimized path information.

In order to avoid a determination of a poor initial path, for example, at least one of an unsmooth path, a long time-consuming path, or a path with a small distance between the path point and an obstacle, the initial path information may be optimized. According to embodiments of the present disclosure, optimizing the initial path information may include smoothing the initial path information to generate a target optimized path information. The smoothing may be performed, for example, by using a conjugate gradient descent method or other suitable methods, which is not limited in embodiments of the present disclosure.

It may be understood that the target optimized path information is generated by optimizing the initial path information. The target optimized path information is a data set containing a plurality of optimized path points. Similarly, the plurality of optimized path points may form a target optimized path.

For example, considering an actual motion constraint of the vehicle, the conjugate gradient descent method may be used to optimize a curvature, a smoothness and a distance from an obstacle of each path point in the initial path information, so as to generate the target optimized path information. Thus, a smoother target optimized path may be obtained, and the optimized path may be more suitable for the vehicle.

In embodiments of the present disclosure, by smoothing the initial path information, the smoothness of the path may be improved, the time-consuming of the path and the energy consumption of the vehicle driving process may be reduced, and a collision with the obstacle may be avoided to ensure a safety of the vehicle driving process.

In operation S230, an optimized mapping relationship for velocity is determined according to the target optimized path information and a first energy consumption constraint parameter.

According to embodiments of the present disclosure, the target optimized path determined by the target optimized path information includes a plurality of path segments. Each of the plurality of path segments includes a plurality of path points at which the travel direction of the vehicle is the same or similar. Therefore, the target optimized path may be segmented according to the travel direction of the vehicle, so as to obtain a plurality of path segments with respective extension directions (corresponding to the travel direction of the vehicle). According to embodiments of the present disclosure, each of the plurality of path segments corresponds to forward, backward or steering of the vehicle.

According to embodiments of the present disclosure, an initial mapping relationship for velocity may be determined according to the target optimized path information. The initial mapping relationship for velocity indicates a velocity information corresponding to each path segment in the target optimized path. The velocity information may include, for example, a velocity, an acceleration, and an amplitude of jerk.

According to embodiments of the present disclosure, the first energy consumption constraint parameter indicates a corresponding relationship between the velocity information and a target energy consumption value per unit time interval. The optimized mapping relationship for velocity may be determined by optimizing the initial mapping information for velocity using the first energy consumption constraint parameter, so as to further reduce the time-consuming for the path and the energy consumption of the vehicle driving process.

In operation S240, an optimized trajectory for the vehicle is determined according to the target optimized path information and the optimized mapping relationship for velocity.

According to embodiments of the present disclosure, when generating the optimized mapping relationship for velocity, the optimized trajectory for the vehicle may be determined according to the target optimized velocity information and the optimized mapping relationship for velocity. The autonomous driving of the vehicle may be controlled according to the optimized trajectory for the vehicle. For example, the vehicle may be controlled to drive on the target optimized path according to the velocity information in the optimized mapping relationship for velocity.

According to embodiments of the present disclosure, the initial path information is optimized to generate the target optimized path information, and the velocity optimization is performed using the first energy consumption constraint parameter on the basis of the target optimized path information, so as to determine the optimized trajectory for the vehicle. Compared with the method of determining the vehicle travel trajectory with the shortest path as the target, the present disclosure may determine the vehicle travel trajectory in a simple and efficient manner. In addition, the determined driving trajectory may implement a stability, a safety and a low energy consumption of the vehicle.

Figure 3:
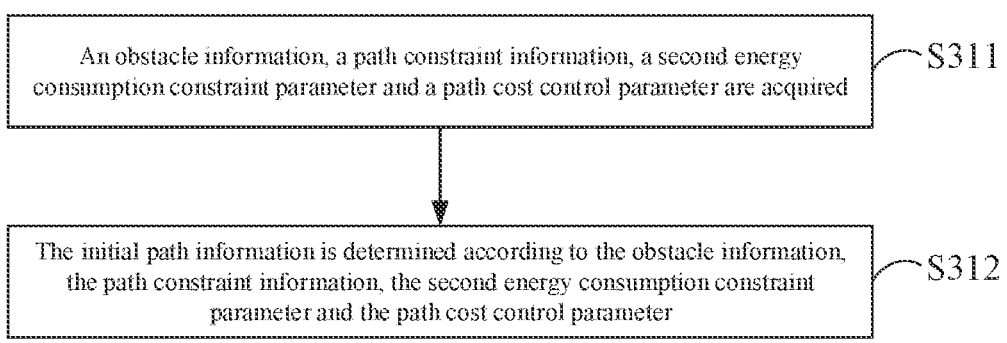
FIG. 3 shows a flowchart of a method of determining an initial path information according to embodiments of the present disclosure.

FIG. 3 shows a flowchart of a method of determining an initial path information according to embodiments of the present disclosure.

As shown in FIG. 3, the method of determining the initial path information includes operations S311 to S312.

In operation S311, an obstacle information, a path constraint information, a second energy consumption constraint parameter and a path cost control parameter are acquired.

According to embodiments of the present disclosure, the obstacle information may contain, for example, global coordinates of the obstacle and a contour of the obstacle. The obstacle information may be acquired using any one or more obstacle recognition methods, which is not limited herein. The contour of the obstacle may be represented as a closed polygon. Certainly, embodiments of the present disclosure are not limited to this. In some embodiments, the contour of the obstacle may also be represented as an open shape, such as the contour of the obstacle facing a side of the vehicle side.

In an example, when acquiring the obstacle information, the contour of the obstacle may be expanded with a preset proportion, so as to reserve a safe distance between the vehicle and the obstacle, so that the driving safety of the vehicle may be further improved.

According to embodiments of the present disclosure, the path constraint information may include, for example, a position constraint information and a velocity constraint information of the starting point, a position constraint information and a velocity constraint information of the target point, a position constraint and a curvature constraint, etc., of a second path point determined by a starting point orientation information without limitation. For example, in order to meet a limit of a minimum turning radius of the vehicle, a preset curvature may be determined in advance as the curvature constraint. The minimum turning radius refers to a radius of turning circle where a center of an outer steering wheel rolls on a support plane in a case that the steering wheel turns to a limit position and the vehicle turns at a lowest stable speed.

According to embodiments of the present disclosure, the path cost control parameter may include, for example, an obstacle distance cost, a minimum curvature cost and an optimal energy consumption cost. The obstacle distance cost refers to a sum of distances between a plurality of path points connected to form a path and an edge of the nearest obstacle. The minimum curvature cost refers to an overall curvature of the formed path. The optimal energy consumption cost refers to an overall energy consumption of the formed path.

According to embodiments of the present disclosure, the second energy consumption constraint parameter indicates an energy consumption cost from the vehicle starting point to a current path point. When confirming that the vehicle reaches a target point corresponding to the current path point, the overall energy consumption of the formed path may be determined according to the second energy consumption constraint parameter.

According to embodiments of the present disclosure, determining the second energy consumption constraint parameter associated with the current path point may include the following operations: looking up a plurality of first energy consumption calibration relationships according to a ground type of the current path point, so as to obtain a current energy consumption value per unit path associated with the current path point; and determining the second energy consumption constraint parameter associated with the current path point according to the current energy consumption value per unit path. Each of the plurality of first energy consumption calibration relationships indicates a corresponding relationship between the ground type and the energy consumption value per unit path.

According to embodiments of the present disclosure, each of the plurality of first energy consumption calibration relationships may be determined using Equation (1):

$$q_{eng} = \frac{q_t A_t + k q_u A_u}{A_t + k A_u} \quad \text{Equation (1)}$$

where $q_{eng}$ indicates a target energy consumption value per unit path, $q_t$ indicates an extra average energy consumption value per unit path caused by a friction between the vehicle and a ground, $q_u$ indicates an average energy consumption value per unit path of a ground between driving wheels on opposite sides of the vehicle, $A_t$ indicates a contact area between the vehicle and the ground, $A_u$ indicates an area between the driving wheels of the vehicle, K is a constant, and $q_t$ and $q_u$ are associated with the ground type.

According to embodiments of the present disclosure, since different vehicles have different sensitivity to the energy consumption, each of the plurality of first energy consumption calibration relationships for each vehicle may be determined according to a condition of the vehicle. For example, in an example where the vehicle is an electric shovel, in Equation (1), $q_t$ may represent an extra average energy consumption value per unit path caused by a friction between two tracks of the electric shovel and the ground, $q_u$ may represent an average energy consumption value per unit path of the ground between the two tracks of the electric shovel, $A_t$ may represent a contact area between the two tracks of the electric shovel and the ground, and $A_u$ may represent an area between the two tracks of the electric shovel. Accordingly, each of the plurality of first energy consumption calibration relationships for the electric shovel may be obtained. It may be understood that for other vehicles, each of the plurality of first energy consumption calibration relationships for each vehicle may also be determined according to the condition of the vehicle, which will not be described in detail here for concise.

According to embodiments of the present disclosure, the ground type may include, but is not limited to a material of a ground soil, a degree of ground bumpiness, a change of ground height and other information, which may be set according to the actual situation and is not limited here. In order to facilitate comparison, the degree of bumpiness of a vehicle on different ground types may be divided into a plurality of levels, and each of the plurality of levels may correspond to a value between 0 and 1, for example. In an example where the ground type is a gravel ground, the degree of bumpiness may be, for example, 0.3. For another example, in an example where the ground type is a flat cement ground, the degree of bumpiness may be, for example, 0.1.

In an example, a relationship between the ground type and $q_t$, $q_u$ may be determined by a data calibration. It may be understood that the degree of bumpiness of the vehicle on different ground types is positively correlated with a magnitude of $q_t$ and $q_u$. If the ground is flat and not easy to slip, $q_t$ and $q_u$ are relatively small; in a converse situation, $q_t$ and $q_u$ are relatively great. For example, if the ground type is a flat cement ground (the corresponding degree of bumpiness is, for example, 0.1), the vehicle may drive stably on the flat cement ground, then $q_t$ and $q_u$ are relatively small; if the ground type is an uneven puddle ground (the corresponding degree of bumpiness is, for example, 0.8), the vehicle is not easy to drive on this uneven puddle ground, and the driving wheel of the vehicle is easy to slip, then $q_t$ and $q_u$ are relatively greater.

According to embodiments of the present disclosure, in determining the relationship between the ground type and $q_t$, $q_u$ using the data calibration, the following method may be adopted, for example. A vehicle may be driven on different types of ground at a preset speed, and the energy consumption value corresponding to various ground types (including $q_t$ and $q_u$) may be acquired, then the relationship between the ground type and $q_t$, $q_u$ may be determined.

For example, the vehicle may be driven at a preset speed on a gravel ground/a ground with degree of bumpiness of 0.3, and n energy consumption data points may be acquired. An average value of these n energy consumption data points may be determined as an energy consumption value for the gravel ground/the ground with degree of bumpiness of 0.3. Similarly, the energy consumption value (including $q_t$ and $q_u$) corresponding to the vehicle on other types of ground may be acquired, so that the relationship between the ground type and $q_t$, $q_u$ may be determined.

In some embodiments, the constant k in Equation (1) may be adjusted according to the actual situation, so as to adjust a degree of an influence of $q_u$ on the target energy consumption value per unit path, so that a calculation requirement of the energy consumption value under different ground types may be satisfied.

According to embodiments of the present disclosure, the second energy consumption constraint parameter may be determined by Equation (2):

$$g(x) = q_{eng\_current} \cdot \delta l + g_{extra} \quad \text{Equation (2)}$$

where $g(x)$ indicates the second energy consumption constraint parameter, $q_{eng\_current}$ indicates the current energy consumption value per unit path, $\delta l$ indicates a distance between a starting point and the current path point, and $g_{extra}$ indicates an energy consumption increased by an extra path of the vehicle.

According to embodiments of the present disclosure, the energy consumption increased by the extra path of the vehicle $g_{extra}$ may include, for example, an energy consumption increased by a vehicle turning path or an energy consumption increased by a vehicle reversing path. The energy consumption increased by the extra path of the vehicle $g_{extra}$ may be preset according to the actual situation, or may be determined by a data calibration, which will not be described in detail here.

In operation S312, the initial path information is determined according to the obstacle information, the path constraint information, the second energy consumption constraint parameter and the path cost control parameter.

In an example, a Hybrid A* algorithm may be used to determine the initial path information according to the obstacle information, the path constraint information, the second energy consumption constraint parameter and the path cost control parameter.

In embodiments of the present disclosure, a plurality of paths may be formed by connecting the path points between the vehicle starting point and the target point according to the obstacle information, the path constraint information and the second energy consumption constraint parameter, and a path cost for each of the plurality of paths, such as a minimum curvature cost, an obstacle distance cost and an optimal energy consumption cost, may be calculated according to the path cost control parameter. Then, the path with a lowest path cost in the plurality of paths may be determined as the initial path.

According to embodiments of the present disclosure, in a process of determining the initial path information, factors such as path turning radius, ground condition, obstacle information and vehicle traveling speed are comprehensively considered to obtain a better path, which may further optimize the stability, safety and low energy consumption of the vehicle driving.

A process of generating the target optimized path information will be described below with reference to FIG. 4A and FIG. 4B.

Figure 4A:
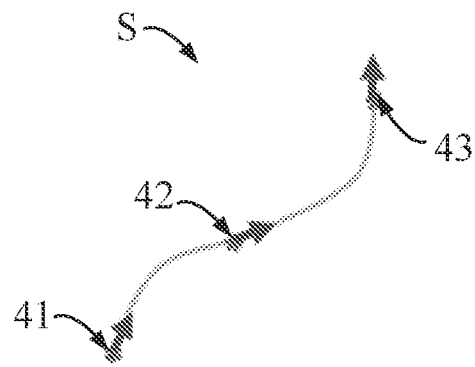
FIG. 4A is a schematic diagram of a process of generating a target optimized path information according to embodiments of the present disclosure.

FIG. 4A shows a schematic diagram of the process of generating the target optimized path information according to the embodiment of the present disclosures.

Take a determination of the initial path information using a Hybrid A* algorithm as an example. As shown in FIG. 4A, in a process of determining the current path point from the vehicle starting point, a plurality of first energy consumption calibration relationships may be found according to a ground type Gc of the current path point, so as to obtain a current energy consumption value per unit path associated with the current path point. Then, a second energy consumption constraint parameter g2 associated with the current path point is determined 410 according to the current energy consumption value per unit path.

Next, a plurality of current path points may be determined according to the obstacle information Ob, the path constraint information Sc and the second energy consumption constraint parameter g2. For each of the plurality of current path points, the above operation of determining the path point may be repeatedly performed until the vehicle reaches the target point corresponding to the current path point. Thus, a plurality of paths may be formed between the vehicle starting point and the target point by connecting the path points. A path cost of each of the plurality of paths, such as the minimum curvature cost, the obstacle distance cost and the optimal energy consumption cost may be calculated according to the path cost control parameter Cp. Then, the path with the lowest path cost in the plurality of paths is determined as the initial path, that is, an initial path information Sr is determined 420.

Then, the initial path information Sr may be optimized 430 to generate a target optimized path information Sf. The target optimized path information Sf may correspondingly generate the target optimized path.

Figure 4B:
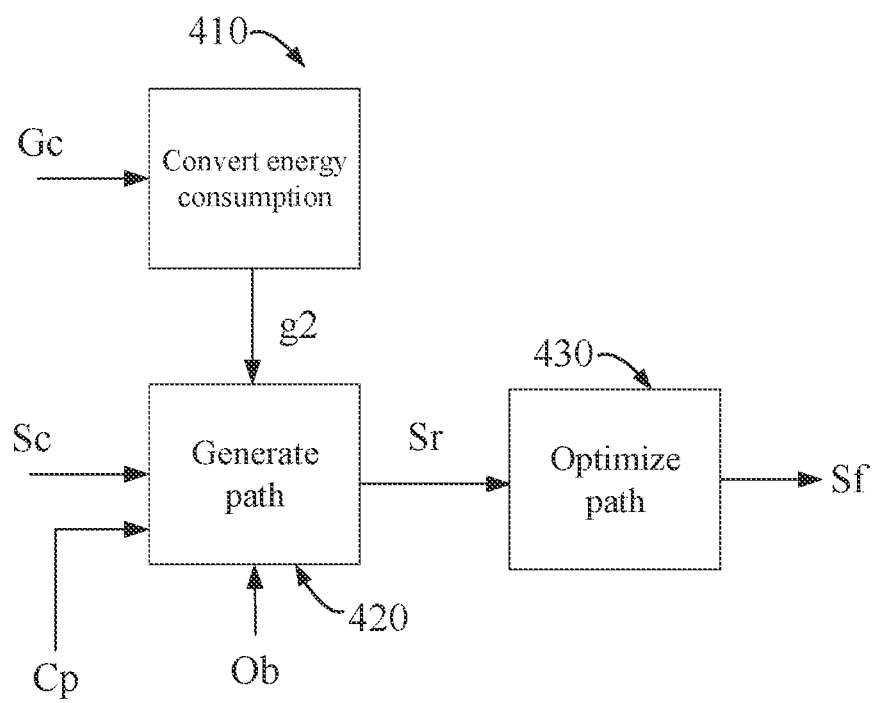
FIG. 4B shows a schematic diagram of a target optimized path according to embodiments of the present disclosure.

FIG. 4B shows a schematic diagram of a target optimized path according to embodiments of the present disclosure.

As shown in FIG. 4B, a target optimized path S includes a starting point 41, a target point 43, and a path point 42 connecting the starting point 41 and the target point 43. An arrow between the starting point 41 and the target point 43 indicates a travel direction of the vehicle. The travel direction of the vehicle may include, for example, forward, backward or steering of the vehicle. In embodiments of the present disclosure, the target optimized path S may be segmented according to the travel direction of the vehicle to obtain a plurality of path segments. Subsequently, a velocity information for each path segment in the plurality of path segments may be determined according to the target optimized path information.

It should be noted that the path point 42 is only an example of the path point between the starting point 41 and the target point 43 to help those skilled in the art understand the solution of the present disclosure, and the present disclosure is not limited thereto.

In embodiments of the present disclosure, in the process of determining the target optimized path information, the path turning radius, the ground condition, the obstacle information, the vehicle traveling speed, etc. are comprehensively considered, so that a better path may be obtained, and the stability, safety and low energy consumption of the vehicle driving may be further optimized.

Figure 5:
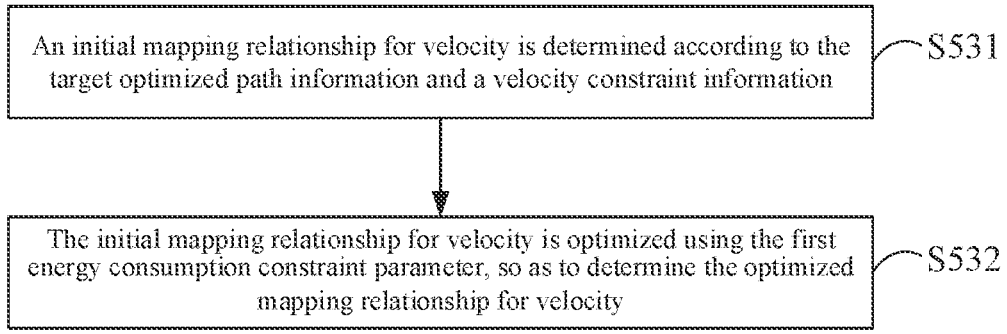
FIG. 5 shows a flowchart of a method of determining an optimized mapping relationship for velocity according to embodiments of the present disclosure.

FIG. 5 shows a flowchart of a method of determining an optimized mapping relationship for velocity according to embodiments of the present disclosure.

As shown in FIG. 5, the method of determining the optimized mapping relationship for velocity includes operations S531 to S532.

In operation S531, an initial mapping relationship for velocity is determined according to the target optimized path information and a velocity constraint information.

According to embodiments of the present disclosure, the target optimized path information may correspondingly form the target optimized path. The target optimized path may be segmented according to the travel direction of the vehicle, so as to obtain a plurality of path segments with respective extension directions (corresponding to the travel direction of the vehicle). According to embodiments of the present disclosure, each of the plurality of path segments corresponds to the forward, backward or steering of the vehicle respectively.

For each path segment of the plurality of path segments, a quadratic programming algorithm may be used to determine the initial mapping relationship for velocity of each path segment of the plurality of path segments according to the target optimized path information and the velocity constraint information. The initial mapping relationship for velocity indicates the velocity information corresponding to each path segment in the target optimized path. The velocity information may include, for example, a velocity, an acceleration, and an amplitude of jerk.

For example, the quadratic programming algorithm may be used to determine the velocity information of each path segment in the plurality of path segments with a continuity of velocity and a smoothness of acceleration as an optimization target. Thus, the velocity information of each path segment in the target optimized path may be determined.

It should be noted that the energy consumption value per unit time interval of the vehicle on different types of ground may not be considered in the process of determining the initial mapping relationship for velocity.

In operation S532, the initial mapping relationship for velocity is optimized using the first energy consumption constraint parameter, so as to determine the optimized mapping relationship for velocity.

According to embodiments of the present disclosure, the first energy consumption constraint parameter indicates the corresponding relationship between the velocity information and the target energy consumption value per unit time interval. The optimized mapping relationship for velocity may be determined by optimizing the initial mapping information for velocity using the first energy consumption constraint parameter, so that the time-consuming of the path and the energy consumption in the vehicle driving process may be further reduced.

According to embodiments of the present disclosure, determining the first energy consumption constraint parameter may include the following operations: acquiring a velocity information corresponding to each of the plurality of path segments; and looking up a plurality of second energy consumption calibration relationships according to the velocity information, so as to determine the first energy consumption constraint parameters. Each of the plurality of second energy consumption calibration relationships represents the corresponding relationship between the velocity information and the energy consumption value per unit time interval.

In embodiments of the present disclosure, each of the plurality of second energy consumption calibration relationships may be determined by, for example, a data calibration method. A specific implementation process is similar to the above process of determining the first energy consumption calibration relationship, which will not be repeated here.

According to embodiments of the present disclosure, optimizing the initial mapping relationship for velocity using the first energy consumption constraint parameter so as to determine the optimized mapping relationship for velocity may include the following operations: acquiring the velocity information corresponding to each path segment in the plurality of path segments and determining the first energy consumption constraint parameter corresponding to each path segment in the plurality of path segments according to the velocity information; and optimizing the initial mapping relationship for velocity according to the first energy consumption constraint parameter corresponding to each of the plurality of path segments and a velocity optimization constraint information, so as to obtain the optimized mapping relationship for velocity.

According to embodiments of the present disclosure, the velocity optimization constraint information may include, for example, a time constraint information of the vehicle passing through the target optimized path, an energy consumption constraint information of the vehicle passing through the target optimized path, and a velocity smoothing constraint information, which may be specifically set according to the actual situation and not limited in the present disclosure.

In embodiments of the present disclosure, an optimization target function may be established with the velocity optimization constraint information as an optimization target, and then the initial mapping relationship for velocity may be optimized using a nonlinear optimization method to obtain the optimized mapping relationship for velocity, so as to optimize the velocity information.

Here, it is assumed that the target optimized path is divided into (n+1) path segments, which correspond to (n+1) time intervals respectively. The vehicle needs the same travel time to pass through each of the (n+1) path segments, that is, the (n+1) time intervals are identical to each other.

In embodiments of the present disclosure, the optimization target function may be expressed by Equation (3):

$$\min_{\Delta S_k} J(\Delta S_k, \Delta T) = \\ W_E \sum f_E(v_k, a_k) \Delta T + W_T \sum \Delta T + W_S \sum \dot{a}_k^2 \quad \text{Equation (3)}$$

A boundary condition may be expressed by Equation (4):

$$\begin{cases} a_{min} < a_k < a_{max} \\ \sum \Delta S_k = S_{Total} \\ \Delta S_k > 0 \\ \Delta S_0 = S_{Start} \\ \Delta S_n = S_{End} \end{cases} \quad \text{Equation (4)}$$

In Equation (3), $\Delta S_k$ indicates a length of a kth path segment, $\Delta T$ indicates a travel time required for the vehicle to pass through the kth path segment, $W_E$, $W_T$ and $W_S$ respectively represent a weight for the energy consumption, a weight for the time interval and a weight for the velocity smoothness, $f_E(v_k, a_k)$ indicates the first energy consumption constraint parameter, $\dot{a}_k$ indicates a jerk corresponding to the kth path segment, $v_k$ and $a_k$ respectively represent a velocity and an acceleration corresponding to the kth path segment.

In Equation (4), $a_k$ indicates an acceleration corresponding to the kth path segment, $a_{min}$ and $a_{max}$ respectively represent a minimum acceleration and a maximum acceleration, $S_{Total}$ indicates a length of the target optimized path, $\Delta S_0$ and $S_{Start}$ represent a corresponding length of a 0th path segment (that is, near the starting point), $\Delta S_n$ and $S_{End}$ represent a length of an nth path segment.

In Equation (3), $W_E$, $W_T$ and $W_S$ may be set according to the actual situation. In Equation (4), the maximum acceleration $a_{max}$ and the minimum acceleration $a_{min}$ may be preset respectively.

In embodiments of the present disclosure, the jerk $\dot{a}_k$, the acceleration $a_k$ and the velocity $v_k$ may be respectively calculated Equation (5), Equation (6) and Equation (7):

$$v_k = \frac{\Delta S_k}{\Delta T} \quad \text{Equation (5)}$$

$$a_k = \frac{(v_k - v_{k-1})}{\Delta T} \quad \text{Equation (6)}$$

$$\dot{a}_k = \frac{(a_k - a_{k-1})}{\Delta T} \quad \text{Equation (7)}$$

In Equation (6) and Equation (7), $v_{k-1}$ and $a_{k-1}$ respectively represent a velocity and an acceleration corresponding to a (k−1)th path segment.

A process of determining the vehicle travel trajectory will be described below with reference to FIG. 6.

Figure 6:
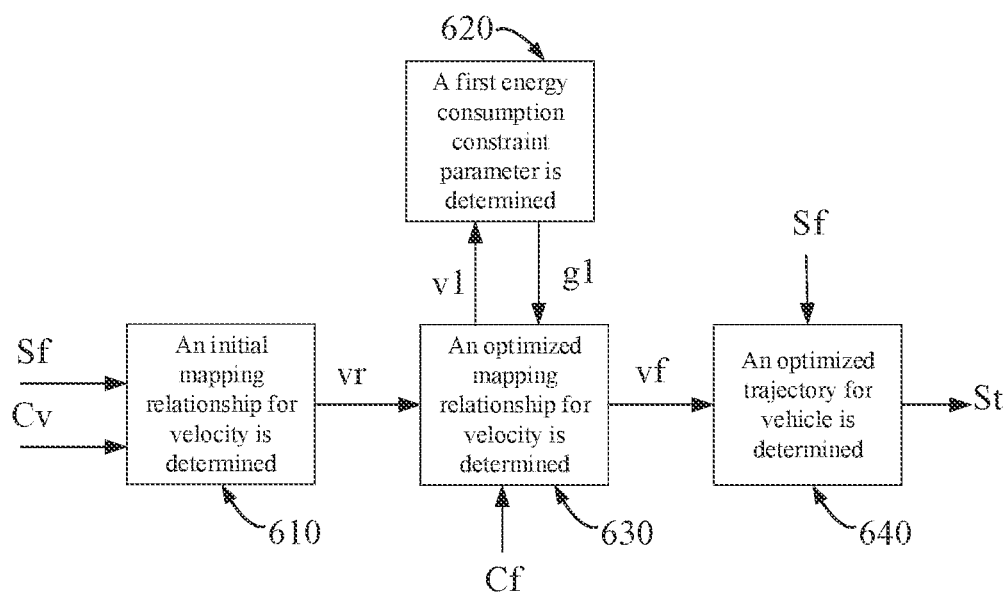
FIG. 6 shows a schematic diagram of a process of determining a vehicle travel trajectory according to embodiments of the present disclosure.

FIG. 6 shows a schematic diagram of the process of determining the vehicle travel trajectory according to embodiments of the present disclosure.

As shown in FIG. 6, when determining the target optimized path information Sf, the target optimized path is determined according to the target optimized path information Sf. The target optimized path is segmented according to the travel direction of the vehicle, so as to obtain a plurality of path segments. For each of the plurality of path segments, for example, a quadratic programming algorithm may be used to determine 610 an initial mapping relationship for velocity vr of each of the plurality of path segments according to the target optimized path information Sf and a velocity constraint information Cv.

Next, for each path segment in the plurality of path segments, a velocity information v1 corresponding to each path segment in the plurality of path segments may be determined according to the initial mapping relationship for velocity vr, and the first energy consumption constraint parameter g1 corresponding to each path segment in the plurality of path segments may be determined 620 according to the velocity information v1. Then, the initial mapping relationship for velocity vr is optimized according to the first energy consumption constraint parameter g1 corresponding to each of the plurality of path segments and the velocity optimization constraint information Cf, so as to obtain an optimized mapping relationship for velocity vf.

Then, an optimized trajectory St for the vehicle may be determined 640 according to the optimized mapping relationship for velocity vf and the target optimized path information Sf.

According to embodiments of the present disclosure, on the basis of the target optimized path, the velocity information is further optimized with the energy consumption, the time interval and the velocity smoothness as the target optimization condition, so as to obtain a trajectory with better energy consumption.

Figure 7:
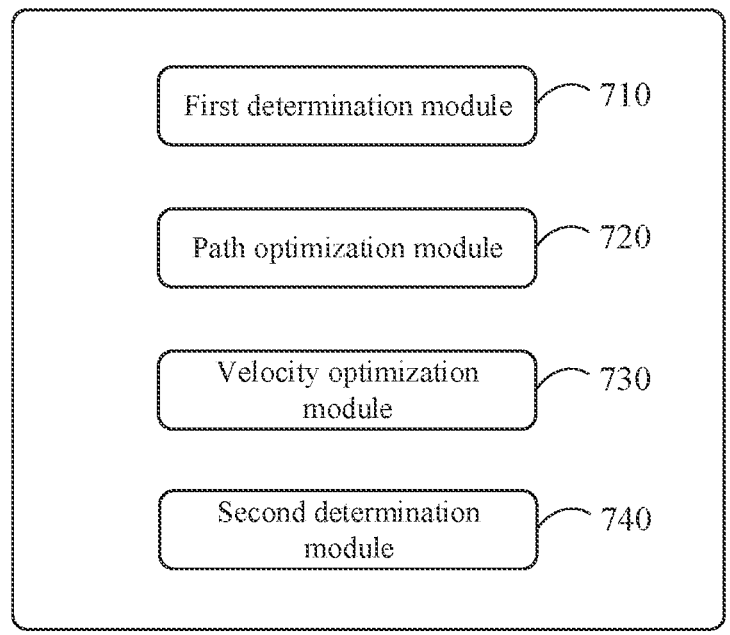
FIG. 7 shows a block diagram of an apparatus of determining a vehicle travel trajectory according to embodiments of the present disclosure.

FIG. 7 shows a block diagram of an apparatus of determining a vehicle travel trajectory according to embodiments of the present disclosure.

As shown in FIG. 7, an apparatus 700 of determining a vehicle travel trajectory includes a first determination module 710, a path optimization module 720, a velocity optimization module 730, and a second determination module 740.

The first determination module 710 is used to determine an initial path information of a vehicle.

The path optimization module 720 is used to optimize the initial path information so as to generate a target optimized path information.

The velocity optimization module 730 is used to determine an optimized mapping relationship for velocity according to the target optimized path information and a first energy consumption constraint parameter.

The second determination module 740 is used to determine an optimized trajectory for the vehicle according to the target optimized path information and an optimized mapping relationship for velocity.

According to embodiments of the present disclosure, the first determination module includes an acquisition unit and a determination unit. The acquisition unit is used to acquire an obstacle information, a path constraint information, a second energy consumption constraint parameter and a path cost control parameters. The determination unit is used to determine the initial path information according to the obstacle information, the path constraint information, the second energy consumption constraint parameter and the path cost control parameter.

According to embodiments of the present disclosure, the path optimization module includes a smoothing unit. The smoothing unit is used to smooth the initial path information so as to generate the target optimized path information.

According to embodiments of the present disclosure, the apparatus 700 of determining the vehicle travel trajectory may further include a lookup module and a first calculation module. The lookup module is used to look up a plurality of first energy consumption calibration relationships according to a ground type of a current path point, so as to obtain a current energy consumption value per unit path associated with the current path point. Each of the plurality of first energy consumption calibration relationships indicates the corresponding relationship between the ground type and the energy consumption value per unit path. The first calculation module is used to determine a second energy consumption constraint parameter associated with the current path point according to the current energy consumption value per unit path.

According to embodiments of the present disclosure, apparatus 700 of determining the vehicle travel trajectory may further include a calibration module. The calibration module is used to determine each of the plurality of first energy consumption calibration relationships by:

$$q_{eng} = \frac{q_t A_t + k q_u A_u}{A_t + k A_u}$$

where $q_{eng}$ indicates a target energy consumption value per unit path, $q_t$ indicates an extra average energy consumption value per unit path caused by a friction between the vehicle and a ground, $q_u$ indicates an average energy consumption value per unit path of a ground between driving wheels on opposite sides of the vehicle, $A_t$ indicates a contact area between the vehicle and the ground, $A_u$ indicates an area between the driving wheels of the vehicle, K is a constant, and $q_t$ and $q_u$ are associated with the ground type.

According to embodiments of the present disclosure, the first calculation module is used to determine the second energy consumption constraint parameter by:

$$g(x) = q_{eng\_current} \cdot \delta l + g_{extra}$$

where g(x) indicates the second energy consumption constraint parameter, $q_{eng\_current}$ indicates the current energy consumption value per unit path, $\delta l$ indicates a distance between a starting point and the current path point, and $g_{extra}$ indicates an energy consumption increased by an extra path of the vehicle.

According to embodiments of the present disclosure, the velocity optimization module includes a mapping unit and an optimization unit. The mapping unit is used to determine an initial mapping relationship for velocity according to the target optimized path information and a velocity constraint information. The optimization unit is used to optimize the initial mapping relationship for velocity by using the first energy consumption constraint parameter, so as to determine the optimized mapping relationship for velocity.

According to embodiments of the present disclosure, the target optimized path information contains a plurality of path segments. The optimization unit includes a first optimization sub-unit and a second optimization sub-unit. The first optimization sub-unit is used to acquire a velocity information corresponding to each path segment in the plurality of path segments, and determine the first energy consumption constraint parameter corresponding to each path segment in the plurality of path segments according to the velocity information. The second optimization sub-unit is used to optimize the initial mapping relationship for velocity according to the first energy consumption constraint parameter corresponding to each of the plurality of path segments and the velocity optimization constraint information, so as to obtain the optimized mapping relationship for velocity.

According to embodiments of the present disclosure, the apparatus 700 of determining the vehicle travel trajectory may further include an acquisition module and a second calculation module. The acquisition module is used to acquire the velocity information corresponding to each of the plurality of path segments. The second calculation module is used to look up a plurality of second energy consumption calibration relationships according to the velocity information so as to determine the first energy consumption constraint parameters. Each of the plurality of second energy consumption calibration relationships indicates the corresponding relationship between the velocity information and the energy consumption value per unit time interval.

It should be noted that implementation modes, to-be-solved technical problems, achieved functions, and achieved technical effects of the modules/units/subunits in the apparatus embodiments are the same as or similar to those of the corresponding steps in the method embodiments, which will not be repeated here.

It should be noted that in the technical solution of the present disclosure, an acquisition, a storage, a use, a processing, a transmission, a provision and a disclosure of user personal information involved comply with provisions of relevant laws and regulations, take necessary confidentiality measures, and do not violate public order and good custom.

In the technical solution of the present disclosure, an authorization or consent of user is obtained before acquiring or collecting the user's personal information.

According to embodiments of the present disclosure, the present disclosure further provides an electronic device, a readable storage medium, a computer program product, and a vehicle.

According to embodiments of the present disclosure, there is provided an electronic device, including: at least one processor; and a memory communicatively connected to the at least one processor. The memory stores instructions executable by at least one processor, and the instructions, when executed by at least one processor, allow the at least one processor to perform the method of determining the vehicle travel trajectory according to embodiments of the present disclosure.

According to embodiments of the present disclosure, there is provided a non-transitory computer-readable storage medium storing computer instructions, and the computer instructions allow a computer to perform the method of determining the vehicle travel trajectory according to embodiments of the present disclosure.

According to embodiments of the present disclosure, there is provided a computer program product containing a computer program, and the computer program, when executed by a processor, is allowed to implement the method of determining the vehicle travel trajectory according to embodiments of the present disclosure.

According to embodiments of the present disclosure, there is provided a vehicle, including the electronic device of any of the above embodiments. The electronic device may be arranged in the vehicle or at a remote end, which is not limited in the present disclosure. The electronic device, during an execution of the processor, may implement the method of determining the vehicle travel trajectory described in the above embodiments.

Figure 8:
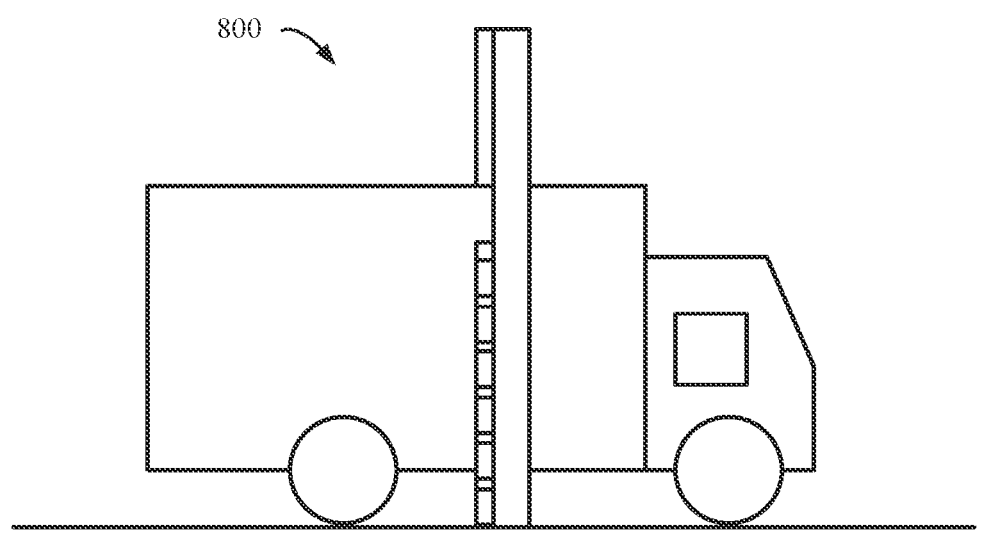
FIG. 8 shows a schematic diagram of a vehicle according to embodiments of the present disclosure.

FIG. 8 shows a schematic diagram of a vehicle according to embodiments of the present disclosure.

As shown in FIG. 8, the present disclosure further provides an example vehicle 800, which may include the electronic device of any of the above embodiments. The vehicle 800 may control a movement of the vehicle 800 according to the optimized trajectory input by the electronic device. It may be understood that the electronic device may be provided in the vehicle 800 or at a remote end, which is not limited in the present disclosure.

In some embodiments, the vehicle 800 may further include a sensing device to acquire various sensing data for autonomous driving. Examples of the sensing device include, but are not limited to, radar, camera, global positioning system (GPS) and various sensors such as angle sensor, speed sensor and proximity sensor.

Figure 9:
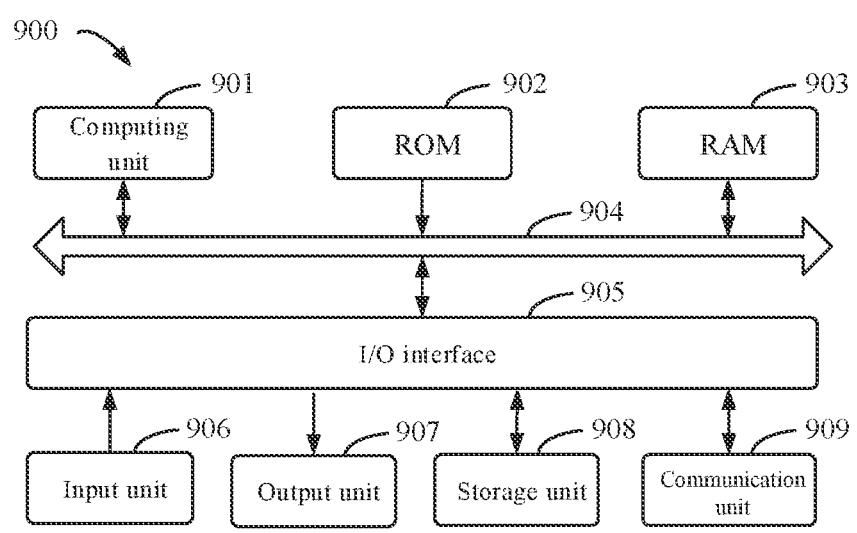
FIG. 9 shows a block diagram of an electronic device for implementing the method of determining the vehicle travel trajectory according to embodiments of the present disclosure.

FIG. 9 shows a schematic block diagram of an exemplary electronic device 900 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 9, the electronic device 900 includes a computing unit 901 which may perform various appropriate actions and processes according to a computer program stored in a read only memory (ROM) 902 or a computer program loaded from a storage unit 908 into a random access memory (RAM) 903. In the RAM 903, various programs and data necessary for an operation of the electronic device 900 may also be stored. The computing unit 901, the ROM 902, and the RAM 903 are connected to each other through a bus 904. An input/output (I/O) interface 905 is also connected to the bus 904.

A plurality of components in the electronic device 900 are connected to the I/O interface 905, including: an input unit 906, such as a keyboard, or a mouse; an output unit 907, such as displays or speakers of various types; a storage unit 908, such as a disk, or an optical disc; and a communication unit 909, such as a network card, a modem, or a wireless communication transceiver. The communication unit 909 allows the electronic device 900 to exchange information/data with other devices through a computer network such as Internet and/or various telecommunication networks.

The computing unit 901 may be various general-purpose and/or a dedicated processing assemblies having processing and computing capabilities. Some examples of the computing units 901 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 901 executes various methods and processing described above, such as the method of determining the vehicle travel trajectory. For example, in some embodiments, the method of determining the vehicle travel trajectory may be implemented as a computer software program which is tangibly embodied in a machine-readable medium, such as the storage unit 908. In some embodiments, the computer program may be partially or entirely loaded and/or installed in the electronic device 900 via the ROM 902 and/or the communication unit 909. The computer program, when loaded in the RAM 903 and executed by the computing unit 901, may execute one or more steps in the method of determining the vehicle travel trajectory. Alternatively, in other embodiments, the computing unit 901 may be configured to perform the method of determining the vehicle travel trajectory by any other suitable means (e.g., by means of firmware).

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a load programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, a magnetic, an optical, an electromagnetic, an infrared, or a semiconductor system, apparatus, or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a blockchain.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of determining a vehicle travel trajectory using at least a first energy consumption constraint parameter, the method comprising:
    obtaining a plurality of first energy consumption calibration relationships according to a ground type of a current path point, so as to obtain a current energy consumption value per unit path associated with the current path point;
    determining a second energy consumption constraint parameter associated with the current path point according to the current energy consumption value per unit path, wherein each of the plurality of first energy consumption calibration relationships indicates a corresponding relationship between the ground type and an energy consumption value per unit path;
    determining an initial path information for a vehicle according to an obstacle information, a path constraint information, the second energy consumption constraint parameter and a path cost control parameter;
    optimizing the initial path information to generate a target optimized path information;
    determining an optimized mapping relationship for velocity according to the target optimized path information and the first energy consumption constraint parameter; and
    determining an optimized trajectory for the vehicle according to the target optimized path information and the optimized mapping relationship for velocity,
    wherein the obstacle information, the path constraint information, and the ground type are captured by at least one sensor integrated on the vehicle, and the vehicle is controlled to drive according to the optimized trajectory for the vehicle.

2. The method of claim 1, wherein the optimizing the initial path information to generate a target optimized path information comprises smoothing the initial path information to generate the target optimized path information.

3. The method of claim 1, further comprising determining each of the plurality of first energy consumption calibration relationships by:

$$q_{eng} = \frac{q_t A_t + k q_u A_u}{A_t + k A_u}$$

where $q_{eng}$ indicates a target energy consumption value per unit path, $q_t$ indicates an extra average energy consumption value per unit path caused by a friction between the vehicle and a ground, $q_u$ indicates an average energy consumption value per unit path of a ground between driving wheels on opposite sides of the vehicle, $A_t$ indicates a contact area between the vehicle and the ground, $A_u$ indicates an area between the driving wheels of the vehicle, K is a constant, and $q_t$ and $q_u$ are associated with the ground type.

4. The method of claim 1, wherein the second energy consumption constraint parameter is determined by:

$$g(x) = q_{eng\_current} \cdot \delta l + g_{extra}$$

where g(x) indicates the second energy consumption constraint parameter, $q_{eng\_current}$ indicates the current energy consumption value per unit path, $\delta l$ indicates a distance between a starting point and the current path point, and $g_{extra}$ indicates an energy consumption increased by an extra path of the vehicle.

5. The method of claim 1, wherein the determining an optimized mapping relationship for velocity according to the target optimized path information and a first energy consumption constraint parameter comprises:
    determining an initial mapping relationship for velocity according to the target optimized path information and a velocity constraint information; and
    optimizing the initial mapping relationship for velocity by using the first energy consumption constraint parameter, so as to determine the optimized mapping relationship for velocity.

6. The method of claim 5, wherein the target optimized path information contains a plurality of path segments; and the optimizing the initial mapping relationship for velocity by using the first energy consumption constraint parameter, so as to determine the optimized mapping relationship for velocity comprises:
    acquiring a velocity information corresponding to each of the plurality of path segments, and determining the first energy consumption constraint parameter corresponding to each of the plurality of path segments according to the velocity information; and
    optimizing the initial mapping relationship for velocity according to the first energy consumption constraint parameter corresponding to each of the plurality of path segments and a velocity optimization constraint information, so as to obtain the optimized mapping relationship for velocity.

7. The method of claim 5, wherein the target optimized path information contains a plurality of path segments; and further comprising:
    acquiring a velocity information corresponding to each of the plurality of path segments; and
    looking up a plurality of second energy consumption calibration relationships according to the velocity information, so as to determine the first energy consumption constraint parameter,
    wherein each of the plurality of second energy consumption calibration relationships indicates a corresponding relationship between the velocity information and an energy consumption value per unit time interval.

8. An electronic device, comprising:
    at least one processor; and
    a memory communicatively connected to the at least one processor, wherein the memory stores instructions executable by the at least one processor, and the instructions, when executed by the at least one processor, cause the at least one processor to perform operations of determining a vehicle travel trajectory using at least a first energy consumption constraint parameter, the operations comprising:
    obtaining a plurality of first energy consumption calibration relationships according to a ground type of a current path point, so as to obtain a current energy consumption value per unit path associated with the current path point;
    determining a second energy consumption constraint parameter associated with the current path point according to the current energy consumption value per unit path, wherein each of the plurality of first energy consumption calibration relationships indicates a corresponding relationship between the ground type and an energy consumption value per unit path;
    determining an initial path information for a vehicle according to an obstacle information, a path constraint information, the second energy consumption constraint parameter and a path cost control parameter;
    optimizing the initial path information to generate a target optimized path information;
    determining an optimized mapping relationship for velocity according to the target optimized path information and the first energy consumption constraint parameter; and
    determining an optimized trajectory for the vehicle according to the target optimized path information and the optimized mapping relationship for velocity,
    wherein the obstacle information, the path constraint information, and the ground type are captured by at least one sensor integrated on the vehicle, and the vehicle is controlled to drive according to the optimized trajectory for the vehicle.

9. The electronic device of claim 8, wherein the at least one processor is further configured to perform an operation of smoothing the initial path information to generate the target optimized path information.

10. The electronic device of claim 8, wherein the at least one processor is further configured to perform an operation of determining each of the plurality of first energy consumption calibration relationships by:

$$q_{eng} = \frac{q_t A_t + k q_u A_u}{A_t + k A_u}$$

where $q_{eng}$ indicates a target energy consumption value per unit path, $q_t$ indicates an extra average energy consumption value per unit path caused by a friction between the vehicle and a ground, $q_u$ indicates an average energy consumption value per unit path of a ground between driving wheels on opposite sides of the vehicle, $A_t$ indicates a contact area between the vehicle and the ground, $A_u$ indicates an area between the driving wheels of the vehicle, K is a constant, and $q_t$ and $q_u$ are associated with the ground type.

11. The electronic device of claim 8, wherein the at least one processor is further configured to perform an operation of determining the second energy consumption constraint parameter by:

$$g(x) = q_{eng\_current} \cdot \delta l + g_{extra}$$

where g(x) indicates the second energy consumption constraint parameter, $q_{eng\_current}$ indicates the current energy consumption value per unit path, $\delta l$ indicates a distance between a starting point and the current path point, and $g_{extra}$ indicates an energy consumption increased by an extra path of the vehicle.

12. The electronic device of claim 8, wherein the at least one processor is further configured to perform operations of:
   determining an initial mapping relationship for velocity according to the target optimized path information and a velocity constraint information; and
   optimizing the initial mapping relationship for velocity by using the first energy consumption constraint parameter, so as to determine the optimized mapping relationship for velocity.

13. The electronic device of claim 12, wherein the target optimized path information contains a plurality of path segments; and the at least one processor is further configured to perform operations of:
   acquiring a velocity information corresponding to each of the plurality of path segments, and determine the first energy consumption constraint parameter corresponding to each of the plurality of path segments according to the velocity information; and
   optimizing the initial mapping relationship for velocity according to the first energy consumption constraint parameter corresponding to each of the plurality of path segments and a velocity optimization constraint information, so as to obtain the optimized mapping relationship for velocity.

14. The electronic device of claim 12, wherein the target optimized path information contains a plurality of path segments; and wherein the at least one processor is further configured to perform operations of:
   acquiring a velocity information corresponding to each of the plurality of path segments; and
   looking up a plurality of second energy consumption calibration relationships according to the velocity information, so as to determine the first energy consumption constraint parameter,
   wherein each of the plurality of second energy consumption calibration relationships indicates a corresponding relationship between the velocity information and an energy consumption value per unit time interval.

15. A vehicle comprising the electronic device of claim 8.

16. A non-transitory computer-readable storage medium storing computer instructions for determining a vehicle trajectory using at least a first energy consumption constraint parameter, wherein the computer instructions, when executed by a computer system, are configured to cause the computer system to at least:
   obtain a plurality of energy consumption calibration relationships according to a ground type of a current path point, so as to obtain a current energy consumption value per unit path associated with the current path point;
   determine a second energy consumption constraint parameter associated with the current path point according to the current energy consumption value per unit path,
   wherein each of the plurality of energy consumption calibration relationships indicates a corresponding relationship between the ground type and an energy consumption value per unit path;
   determine an initial path information for a vehicle according to an obstacle information, a path constraint information, the second energy consumption constraint parameter and a path cost control parameter;
   optimize the initial path information to generate a target optimized path information;
   determine an optimized mapping relationship for velocity according to the target optimized path information and the first energy consumption constraint parameter; and
   determine an optimized trajectory for the vehicle according to the target optimized path information and the optimized mapping relationship for velocity,
   wherein the obstacle information, the path constraint information, and the ground type are captured by at least one sensor integrated on the vehicle, and the vehicle is controlled to drive according to the optimized trajectory for the vehicle.

17. The medium of claim 16, wherein the instructions are further configured to cause the computer system to determine each of the plurality of first energy consumption calibration relationships by:

$$q_{eng} = \frac{q_t A_t + k q_u A_u}{A_t + k A_u}$$

where $q_{eng}$ indicates a target energy consumption value per unit path, $q_t$ indicates an extra average energy consumption value per unit path caused by a friction between the vehicle and a ground, $q_u$ indicates an average energy consumption value per unit path of a ground between driving wheels on opposite sides of the vehicle, $A_t$ indicates a contact area between the vehicle and the ground, $A_u$ indicates an area between the driving wheels of the vehicle, K is a constant, and $q_t$ and $q_u$ are associated with the ground type.

18. The medium of claim 16, wherein the instructions are further configured to cause the computer system to:
   determine an initial mapping relationship for velocity according to the target optimized path information and a velocity constraint information; and
   optimize the initial mapping relationship for velocity by using the first energy consumption constraint parameter, so as to determine the optimized mapping relationship for velocity.

19. The medium of claim 18, wherein the instructions are further configured to cause the computer system to:
   acquire a velocity information corresponding to each of a plurality of path segments of the target optimized path information; and
   obtaining a plurality of second energy consumption calibration relationships according to the velocity information, so as to determine the first energy consumption constraint parameter,
   wherein each of the plurality of second energy consumption calibration relationships indicates a corresponding relationship between the velocity information and an energy consumption value per unit time interval.

20. A vehicle comprising the medium of claim 16.

* * * * *